US012127683B2

(12) United States Patent
Laudet et al.

(10) Patent No.: US 12,127,683 B2
(45) Date of Patent: Oct. 29, 2024

(54) AUTOMATIC ADAPTIVE COMFORT FOR BUNK MATTRESS

(71) Applicant: Volvo Truck Corporation, Gothenburg (SE)

(72) Inventors: Frédéric Laudet, Venissieux (FR); Philippe Lefort, Corbas (FR)

(73) Assignee: Volvo Truck Corporation, Gothenburg (SE)

( * ) Notice: Subject to any disclaimer, the term of this patent is extended or adjusted under 35 U.S.C. 154(b) by 223 days.

(21) Appl. No.: 17/537,431

(22) Filed: Nov. 29, 2021

(65) Prior Publication Data

US 2022/0175151 A1 Jun. 9, 2022

(30) Foreign Application Priority Data

Dec. 3, 2020 (EP) .................................... 20211619

(51) Int. Cl.
*A47C 31/12* (2006.01)
*A47C 17/80* (2006.01)
(Continued)

(52) U.S. Cl.
CPC ............ *A47C 31/123* (2013.01); *A47C 17/80* (2013.01); *A47C 23/0435* (2013.01);
(Continued)

(58) Field of Classification Search
CPC ....... A47C 31/123; A47C 31/12; A47C 17/80; A47C 17/64; A47C 23/0435;
(Continued)

(56) References Cited

U.S. PATENT DOCUMENTS 3,340,548 A * 9/1967 Janapol ................ A47C 23/063 297/284.3
4,222,137 A * 9/1980 Usami ................ A47C 23/0435 5/935
(Continued)

FOREIGN PATENT DOCUMENTS

CA 2892504 A1 * 6/2014 ......... A47C 23/0435
CA 2892504 C * 9/2020 ......... A47C 23/0435
(Continued)

OTHER PUBLICATIONS

European Search Report for European U.S. Appl. No. 20/211,619, completed May 3, 2021, 7 pages.

*Primary Examiner* — Robert G Santos
(74) *Attorney, Agent, or Firm* — Withrow & Terranova, PLLC

(57) ABSTRACT

The disclosure relates to a bunk, in particular for a vehicle cabin. The bunk comprises a base plate, an upper layer, a plurality of supporting members vertically compressible and spaced apart from one another substantially over the whole surface of the bunk, a plurality of pressure sensors which are part of the upper layer and in an adaptable area comprising at least one area of the bunk, a moving mechanism configured to move at least some of the supporting members in the adaptable area parallel to the base plate, and a control unit connected to the pressure sensors and the moving mechanism. The control unit is configured to cause the moving mechanism to move the supporting members in the adaptable area as a function of the current pressure data provided by the pressure sensors, to locally change the density of the supporting members to provide a locally variable bunk firmness.

12 Claims, 6 Drawing Sheets

(51) Int. Cl.
*A47C 23/043* (2006.01)
*A47C 27/06* (2006.01)
*B60P 3/38* (2006.01)

(52) U.S. Cl.
CPC .......... *A47C 27/061* (2013.01); *A47C 27/064* (2013.01); *B60P 3/38* (2013.01); *A47C 23/043* (2013.01); *A47C 31/12* (2013.01)

(58) Field of Classification Search
CPC ..... A47C 23/043; A47C 23/04; A47C 27/061; A47C 27/063; A47C 27/064; A47C 27/07; B60P 3/28; B60P 3/36; B60P 3/38
USPC ......... 5/118, 9.1, 690, 697, 716, 720, 655.7, 5/655.8, 936
See application file for complete search history.

(56) References Cited

U.S. PATENT DOCUMENTS

| | | | | | |
|---|---|---|---|---|---|
| 4,667,357 | A * | 5/1987 | Fortune | A47C 27/061 | 5/936 |
| 5,113,539 | A * | 5/1992 | Strell | A47C 27/10 | 297/284.3 |
| 5,896,604 | A * | 4/1999 | McLean | A47C 19/027 | 297/284.8 |
| 8,918,928 | B2 * | 12/2014 | Verschuere | A47C 23/0435 | 267/89 |
| 10,278,512 | B2 * | 5/2019 | Stjerna | A47C 31/123 | |
| 10,334,957 | B2 * | 7/2019 | Edling | A47C 27/064 | |
| 2006/0253994 | A1 * | 11/2006 | Spinks | A47C 27/064 | 5/727 |
| 2011/0258772 | A1 * | 10/2011 | Verschuere | A47C 23/0435 | 5/11 |
| 2015/0320229 | A1 * | 11/2015 | Edling | B60N 2/72 | 5/690 |
| 2019/0015183 | A1 * | 1/2019 | Liu | A61C 17/3436 | |
| 2019/0104860 | A1 * | 4/2019 | Blumberg | A61G 7/00 | |
| 2022/0175151 | A1 * | 6/2022 | Laudet | A47C 23/0435 | |

FOREIGN PATENT DOCUMENTS

| | | | | |
|---|---|---|---|---|
| CN | 101422305 A | | 5/2009 | |
| CN | 106667435 A | | 5/2017 | |
| CN | 109077526 A | | 12/2018 | |
| DE | 102016011612 A1 | | 4/2017 | |
| EP | 2745745 A1 | | 6/2014 | |
| EP | 2878231 A1 | | 6/2015 | |
| EP | 4008220 A1 | * | 6/2022 | A47C 17/80 |
| EP | 4008220 B1 | * | 3/2024 | A47C 17/80 |
| WO | 2006100093 A1 | | 9/2006 | |
| WO | WO-2014095552 A1 | * | 6/2014 | A47C 23/0435 |

* cited by examiner

AUTOMATIC ADAPTIVE COMFORT FOR BUNK MATTRESS

RELATED APPLICATIONS

The present application claims priority to European Patent Application No. 20211619.0, filed on Dec. 3, 2020, and entitled "AUTOMATIC ADAPTIVE COMFORT FOR BUNK MATTRESS," which is incorporated herein by reference in its entirety.

TECHNICAL FIELD

The invention relates to a bunk.

In particular, the invention can be applied in heavy-duty vehicles, such as trucks, having a cabin equipped with such a bunk.

BACKGROUND

Some vehicles, such as trucks, often travel over long distances. There is therefore a need for the driver to make regular stops to have some rest, and even to sleep. For that purpose, the vehicle can have a cabin equipped with a bunk.

Vehicle manufacturers generally propose only one kind of bunk for all vehicles, whatever the stature, weight, etc. of the user. This means that the bunk may not satisfy all customers, given the huge diversity of their anatomical features.

Besides, the pressure distribution on the body changes depending on the user's position on the bunk. For example, this pressure distribution changes whether the user lies on his back or on his side—in which position there are higher constraints in the shoulder and pelvis areas. As a result, the user's comfort may significantly change during the night, depending on his position on the bunk.

As a good and restorative night is of paramount importance for avoiding the risk of drowsiness, or even the risk of falling asleep, there is a crucial interest to improve the bunk comfort, to ultimately increase safety.

SUMMARY

An object of the invention is to provide a bunk having an increased comfort for the user.

For that purpose, the invention relates to a bunk, in particular for a vehicle cabin, comprising:

- a base plate;
- an upper layer;
- a plurality of supporting members which are vertically compressible, such as springs, the supporting members being arranged spaced apart from one another, according to an array, substantially over the whole surface of the bunk;
- a plurality of pressure sensors which are part of the upper layer and arranged in at least one area of the bunk called adaptable area;
- a moving mechanism connected to at least some of the supporting members located in the adaptable area, configured to move said supporting members with respect to and parallel to the base plate;
- a control unit connected to the pressure sensors and to the moving mechanism, the control unit being configured to cause the moving mechanism to automatically and dynamically move the supporting members in the adaptable area, as a function of the current pressure data provided by the pressure sensors, so as to locally change the density of the supporting members in order to provide a locally variable bunk firmness.

Thus, owing to the invention, the bunk can provide a real-time adaptation of the local firmness in one or several areas of the bunk, to better suit the current needs of the bunk's user and constantly adjust during the user's rest or night. In particular, the bunk can dynamically adapt to the user's position on the bunk, i.e. to the pressure distribution on the bunk.

The "density" of the supporting members means the number of supporting members per area unit of the base plate. The overall density in an adaptable area of the bunk can remain unchanged, while the positions of the supporting members may vary in said adaptable area, resulting in density changing locally in one or several sub-area(s) of said adaptable area.

One feature of the bunk according to the invention is that the pressure sensors are part of the upper layer. The pressure sensors may be embedded in said upper layer. In concrete terms, in an embodiment, the pressure sensors can be embedded in a sheet of the upper layer, for example by being assembled with other components to form such a sheet. Said sheet including the pressure sensors can be located adjacent one or several other sheets of the upper layer; for example, it can be sandwiched between two sheets of the upper layer. Alternatively, in another embodiment, the pressure sensors can be located and secured between two sheets of the upper layer, without being part of a specific sheet.

The pressure sensors may be located over the whole bunk surface, or only in the or each adaptable area.

The pressure sensors may comprise a pressure-sensitive wire. This wire can be assembled with yarns (such as textile yarns), for example by weaving or knitting, to form at least part of the upper layer. Alternatively, this wire can be fastened between two sheets, such as two sheets of textile, to form at least part of the upper layer. The pressure-sensitive wire can form a wavy line which extends over the whole adaptable area, or over the whole bunk upper face.

The pressure sensors may comprise a pressure-sensitive thin film fastened to at least one sheet, or between two sheets of the upper layer.

The pressure sensors may comprise distinct sensors, preferably arranged according to an array. These distinct sensors can be embedded in the upper layer, for example between two sheets of the upper layer.

In an embodiment, the bunk comprises a sliding layer arranged between the supporting members and the upper layer, at least in the adaptable area. The sliding layer can be arranged directly on top of the supporting members, or on an upper face of an envelope which houses the supporting members, or under the upper layer with the sliding layer facing downwards, i.e. towards the supporting members.

Such a sliding layer helps to make the movement of the supporting members easier and smoother despite the presence of a user laying on the bunk.

Other technical solutions can be envisaged to achieve the same goal. For example, the supporting member to be moved can first be vertically compressed, then moved (which is easier as the body pressure is exerted on the surrounding supporting members but not—or to a much lesser extent—on the compressed supporting member), and finally released.

The bunk may comprise at least two adaptable areas.

The bunk may comprise one first adaptable area, which corresponds to a user's shoulder area. Said first adaptable area may be defined between two lines which, from the transverse end of the bunk located on the user's head side, are located at a distance of around 20% and around 30%, respectively, of the bunk length.

The bunk may also comprise one second adaptable area which corresponds to a user's pelvis area. Said second adaptable area may be defined between two lines which, from the transverse end of the bunk located on the user's head side, are located at a distance of around 40% and around 60%, respectively, of the bunk length. The second adaptable area is useful in particular for adapting the pressure exerted at the level or in the vicinity of the user's hips.

The first and second adaptable areas can be separate; then, controlling the moving mechanism can be made independently in each adaptable area. Alternatively, the bunk can include one single adaptable area including these first and second adaptable areas as well as a possible intermediate area in between; then, for example, the single adaptable area can correspond to a user's torso and pelvis area.

In case the single adaptable area or the set of adaptable areas do not cover the whole bunk surface, the supporting members outside the adaptable area(s) can preferably be stationary relative to the base plate, at least along a direction parallel to the base plate.

The bunk may have a substantially rectangular shape defining a longitudinal direction and a transverse direction.

In the adaptable area, the bunk may comprise at least one row of supporting members which extends transversally, the supporting members of said row being movable together, typically as a whole, by the moving mechanism along the longitudinal direction. The supporting members of the row can thus be moved closer to or apart from the adjacent supporting members, to locally change the density of supporting members. Said row of supporting members can extend transversally over the whole bunk width, or not.

Alternatively, or in addition, in an adaptable area, the bunk may comprise at least one column of supporting members which extends longitudinally, the supporting members of said column being movable together, typically as a whole, by the moving mechanism along the transverse direction.

The movements along the longitudinal and transverse directions can be combined. Alternatively, only one movement can be possible; then, it is preferably along the longitudinal direction.

The moving mechanism can comprise a motor and an actuator operated by the motor and capable of moving the supporting members. The actuator can be a pneumatic member. Alternatively, it can be a cable forming a loop. In an embodiment, the loop has a fixed length, and the cable turns so that one point of the cable moves along said loop; the supporting members can be secured to a point of the cable, for example by means of a slider secured to the cable and engaged in a rail; then, moving the cable along the loop causes the movement of the supporting members. In another embodiment, the cable can be wounded such that the length of the loop decreases; this causes the movement of the supporting members, for example through a pulling movement exerted by the cable on the supporting members or on a member fastened to the supporting members.

According to an embodiment, two adjacent supporting members in the adaptable area can be linked by an elastic connection which in a neutral state is pre-tensioned and further extendable, such that these adjacent supporting members can be moved relative to one another when an appropriate action is applied by the moving mechanism on the supporting members, and can elastically return to the neutral state when said action is released. Releasing said action can consist stopping any action, or in applying a reverse action, so that the supporting members can go back to the neutral state.

Two adjacent supporting members in the adaptable area can be linked by a non-extendable connection which allows transmitting the motion of one of said supporting members, caused by the moving mechanism, to the other one of said supporting members. The non-extendable connection can be active only above a predetermined distance between said adjacent supporting members. In concrete terms, the non-extendable connection can be first in a flexed configuration (thus being inactive for motion transmission), then fully extended (thus being able to transmit motion).

Both an elastic connection and a non-extendable connection can be provided between two adjacent supporting members.

At least one supporting member may comprise a plurality of supporting elements, such as four springs, which are rigidly connected to one another and housed in a pouch.

The bunk may further comprise at least one lifting mechanism such as a cylinder, which is arranged under one or several supporting members to vertically compress it/them, so as to further allow locally changing the bunk firmness.

The invention also relates to a vehicle, such as an industrial vehicle comprising a cabin, the vehicle comprising a bunk s previously described.

The invention further relates to a method for dynamically changing the firmness of a bunk in at least one adaptable area of the bunk, the bunk comprising:

- a base plate;
- an upper layer;
- a plurality of supporting members which are vertically compressible, such as springs, the supporting members being arranged spaced apart from one another, according to an array, substantially over the whole surface of the bunk;

wherein the method comprises:

- receiving current pressure data measured in the upper layer in said adaptable area;
- as a function of said current pressure data, automatically and dynamically moving at least some of the supporting members located in the adaptable area with respect to and parallel to the base plate, so as to locally change the density of the supporting members.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
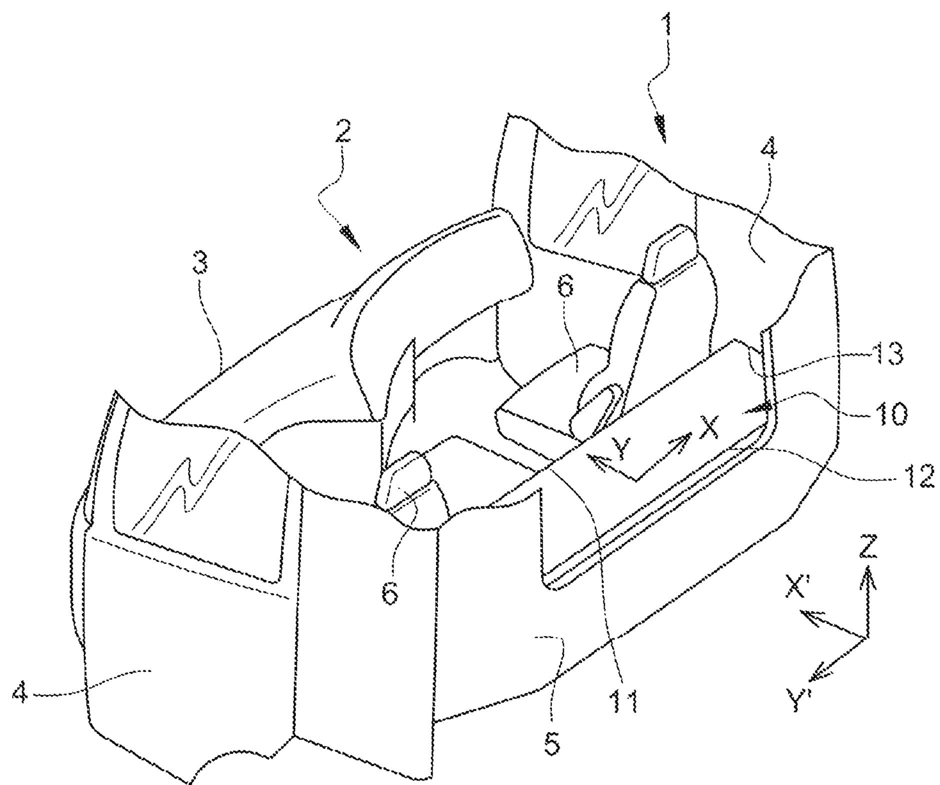
FIG. 1 is a perspective view of a compartment defined by a cabin of a vehicle, comprising a bunk according to an embodiment of the invention.

FIG. 1 partially shows a vehicle 1 which can be an industrial vehicle, such as a truck. The vehicle 1 comprises a cabin 2 having a front wall 3, two side walls 4, and a rear wall 5, which form a driver compartment. The cabin 1 also comprises at least one seat 6 for the driver and possibly one additional seat 6 for a possible passenger.

The vehicle 1 further comprises a bunk 10 for a user 40, typically the driver, to have some rest or to sleep. The bunk 10 is located in the cabin, typically behind the seats 6, i.e. between these seats 6 and the rear wall 5.

Generally, the bunk 10 is arranged horizontally and has a substantially rectangular shape. Direction X is defined as the longitudinal direction of the bunk 10, and corresponds to the transverse direction Y' of the vehicle 1. Direction Y is defined as the transverse direction of the bunk 10, and corresponds to the longitudinal direction X' of the vehicle 1. There is further defined vertical direction Z, which is orthogonal to both X and Y.

The bunk 10 preferably has fixed dimensions. It has two opposite longitudinal edges 11, 12 and two opposite transverse edges, namely one transverse edge 13 near the user's head, and one transverse edge 14 near the user's feet. It has to be noted that the positions of transverse edges 13, 14 in the drawings are only a possible configuration, bearing in mind that the user 40 can be in a reverse position (i.e. the feet near edge 13 and the head near edge 14).

Figure 2:
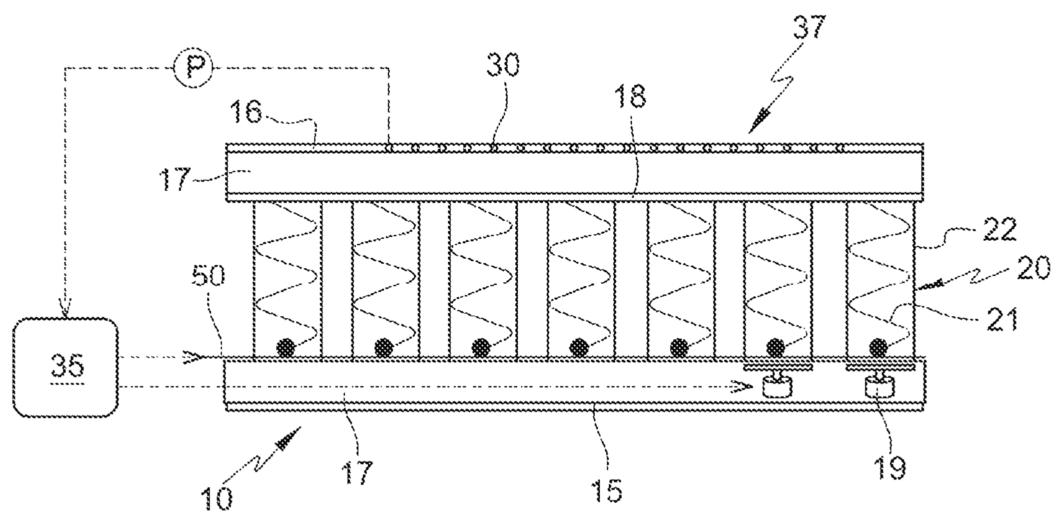
FIG. 2 is a schematic cross section view of the bunk in a vertical longitudinal plane.

As schematically shown in FIG. 2, the bunk 10 comprises a base plate 15 which is substantially horizontal and which is has a mechanical strength high enough to bear a user's weight. The base plate 15 may be secured to the cabin 2, at least in an active position. The base plate 15 may be movable relative to the cabin 2 between said active position, to allow the user 40 to rest, and an inactive position, in order to free up space when the bunk is not used. The bunk 10 also comprises an upper layer 16 on which the user 40 can lie down.

The bunk 10 further comprises a plurality of supporting members 20 which are arranged between the base plate 15 and the upper layer 16, spaced apart from one another, according to an array, substantially over the whole surface of the bunk 10. Each supporting member 20 extends vertically, and is vertically compressible. It may comprise at least one spring 21 preferably housed in a pocket 22. Although the supporting members are illustrated as being regularly spaced apart from one another, this should not be considered as limitative.

A comfort layer 17, such as a foam layer, may be provided between the base plate 15 and the supporting members 20, and/or between the supporting members 20 and the upper layer 16.

According to the invention, the bunk 10 comprises a plurality of pressure sensors 30 which are part of the upper layer 16, and which are arranged in at least one area of the bunk 10 called adaptable area 37.

Figure 6:
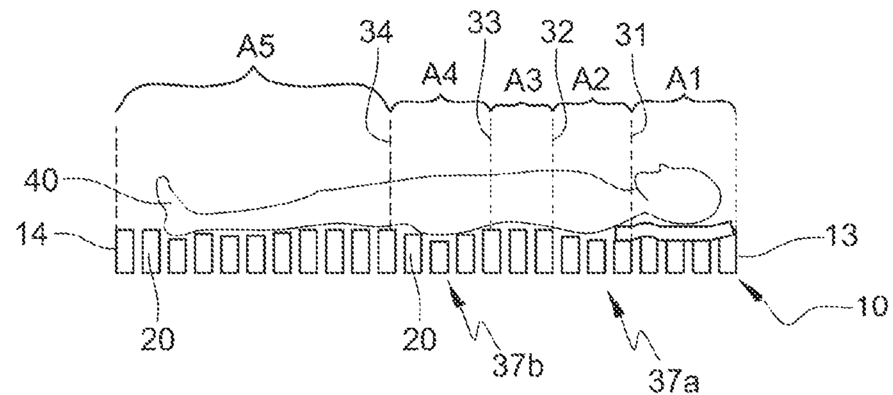
FIG. 6 is a schematic cross section view of the bunk of FIG. 5 in a vertical longitudinal plane, with a user lying on it, on his back.
Figure 8:
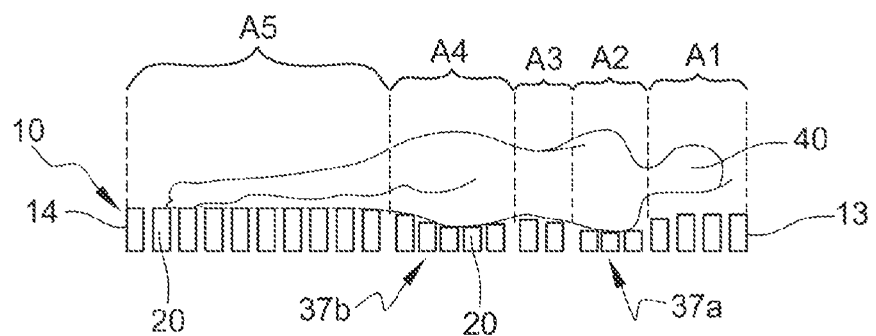
FIG. 8 is a schematic cross section view of the bunk of FIG. 6 in a vertical longitudinal plane, with a user lying on it, on his side.

With reference to FIGS. 6 and 8, several areas may be defined in the bunk 10. Each area can extend from one longitudinal edge 11 to the other 12, and can correspond to a portion of the body when the user 40 is lying on the bunk 10. Thus, for example, from the transverse edge 13 of the bunk 10 located near the user's head, to the transverse edge 14 of the bunk 10 located near the user's feet, there may be defined:

- an area A1 which corresponds to the user's head and neck area, and which is located between the transverse edge 13 and a transverse line 31;
- an area A2 which corresponds to the user's shoulder area, and which is located between the transverse line 31 and a transverse line 32;
- an area A3 which corresponds to the user's abdomen area, and which is located between the transverse line 32 and a transverse line 33;
- an area A4 which corresponds to the user's pelvis area, and which is located between the transverse line 33 and a transverse line 34;
- and an area A5 which corresponds to the user's leg area, and which is located between the transverse line 34 and the transverse edge 14.

It has to be specified that these areas of the bunk take into account the variability of anatomical features among users. Thus, the distance of the transverse lines from the transverse edge 13, expressed as a percentage of the bunk length, can be in the following ranges:

- transverse line 31: 15-21%
- transverse line 32: 24-34%
- transverse line 33: 35-45%
- transverse line 34: 48-65%.

One or several of these areas A1-A5, or a portion of thereof, can be "adaptable area(s) 37", that is to say areas in which the bunk firmness can be adapted. It should be noted that there may be defined more areas in the bunk, or on the contrary less areas, depending on the requirements in terms of adaptation capacity of the bunk firmness.

A moving mechanism 50 is connected to at least some of the supporting members 20 located in the adaptable area 37, and is configured to move said supporting members 20 with respect to and parallel to the base plate 15. In FIG. 2, the moving mechanism 50 is very schematically depicted as an elongated member linked to each of the supporting members 20, the link being schematically represented as a black dot.

A control unit 35 is connected to the pressure sensors 30 and to the moving mechanism 50. The control unit 35 is configured to cause the moving mechanism 50 to automatically and dynamically move the supporting members 20 in the adaptable area 37, as a function of the current pressure data provided by the pressure sensors 30. Thus, the density of the supporting members 20 can be locally changed, in order to provide a locally variable bunk firmness.

In practice, depending on the user's position on the bunk 10 (for example on the back or on the side), the pressure distribution on the bunk 10 varies, and thus the pressure data measured by one given pressure sensor 30 varies. The invention provides a method for dynamically changing the firmness of the bunk 10 in at least one adaptable area 37 of the bunk 10.

In concrete terms, the current pressure data P measured in the upper layer 16 by the pressure sensors 30 is received by the control unit 35. As a function of said current pressure data P, the control unit 35 automatically and dynamically controls the moving mechanism 50 to move at least some of the supporting members 20 located in the adaptable area 37 with respect to and parallel to the base plate 15. This results in locally changing the density of the supporting members 20, and ultimately improving the user's comfort.

In order to make the movement of the supporting members 20 easier, despite the weight of the user 40 on the bunk 10, the bunk 10 may comprise a sliding layer 18 arranged between the supporting members 20 and the upper layer 16, at least in the adaptable area 37.

The bunk 10 may further comprise at least one lifting mechanism 19 such as a cylinder, arranged under one or several supporting members to vertically compress it/them. This allows further locally changing the bunk firmness. The lifting mechanism 19 may be controlled by the control unit 35 as a function of the current pressure data provided by the pressure sensors 30.

Figure 3:
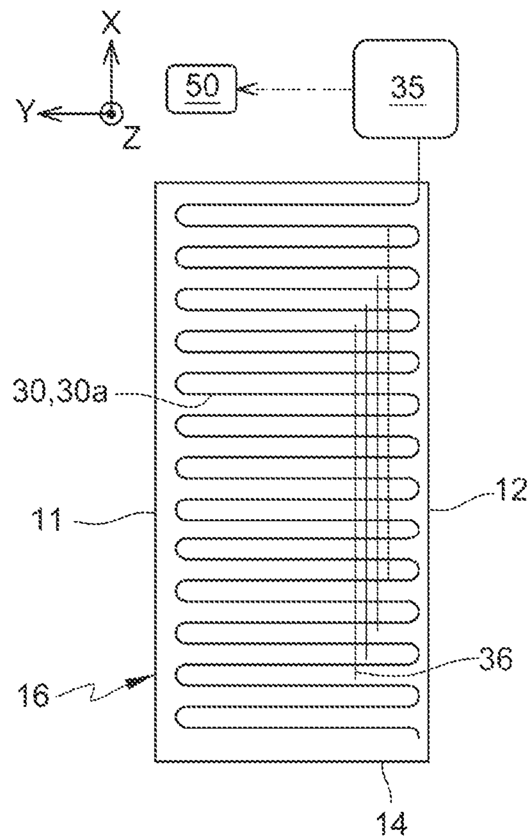
FIG. 3 is a schematic plane view of the bunk showing pressure sensors according to one embodiment.
Figure 4:
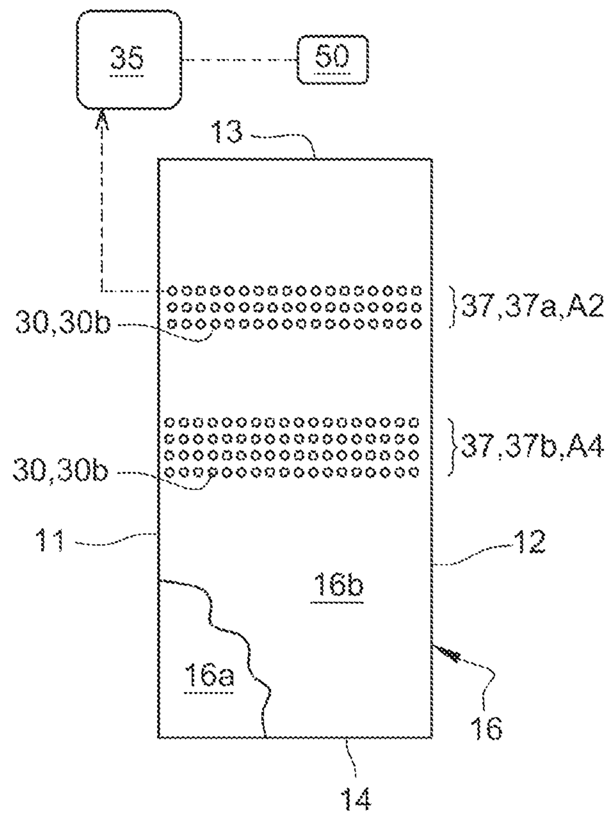
FIG. 4 is a schematic plane view of the bunk showing pressure sensors according to another embodiment.

Reference is now made to FIGS. 3 and 4 which schematically shows two embodiments of pressure sensors 30 in the bunk 10.

In the embodiment of FIG. 3, the pressure sensors 30 are in the form of a pressure-sensitive wire 30*a*. The wire 30*a* may be assembled with yarns 36 (which are schematically and partially illustrated in FIG. 3), for example by weaving or knitting, to form the upper layer 16 or one sheet including in the upper layer 16.

In the non-limiting example of FIG. 3, the pressure-sensitive wire 30*a* forms a wavy line having main portions arranged transversely, and which extends over the whole bunk upper face. However, other implementations could be envisaged such as: a wavy line having main portions arranged longitudinally; a pressure-sensitive wire 30*a* having a different arrangement (zig zag line, non-continuous line, etc.); a pressure-sensitive wire 30*a* extending only in one or several adaptable areas 37 of the bunk not covering the whole bunk surface.

In the embodiment of FIG. 4, the pressure sensors 30 comprise distinct sensors 30*b*. The sensors 30*b* can be arranged according to an array, for example according to a rectangular array. For example, the sensors 30*b* may be spaced apart from one another by a distance of around 50 mm. The sensors 30*b* may be sandwiched between two sheets 16*a*, 16*b* of the upper layer 16. They can be secured, for example by means of an adhesive, to one of said sheets and then covered by the other sheet.

In the non-limiting example of FIG. 4, the pressure sensors 30 do not cover the whole bunk surface, although this could be a possible option. The pressure sensors 30 are located only in adaptable areas 37 of the bunk 10, or possibly only in a sub-area of said adaptable areas 37. In this embodiment, there are provided two adaptable areas 37, namely:

- one first adaptable area 37*a* which corresponds to above-mentioned area A2, i.e. to a user's shoulder area;
- and one second adaptable area 37*b* which corresponds to above-mentioned area A4, i.e. to a user's pelvis area.

The adaptable areas 37*a*, 37*b* are spaced apart from one another but could alternatively be adjacent. The adaptable areas 37*a*, 37*b* extend from one longitudinal edge 11 to the other longitudinal edge 12 but could alternatively extend only over part of the bunk width, for example in a central portion thereof.

An embodiment of a bunk according to the invention is shown in FIGS. 5 to 8. In these figures are only shown the supporting members 20, the moving mechanism 50 and the control unit 35. The pressure sensors 30 can be conform to the previous description with reference to either FIG. 3 or 4.

Figure 5:
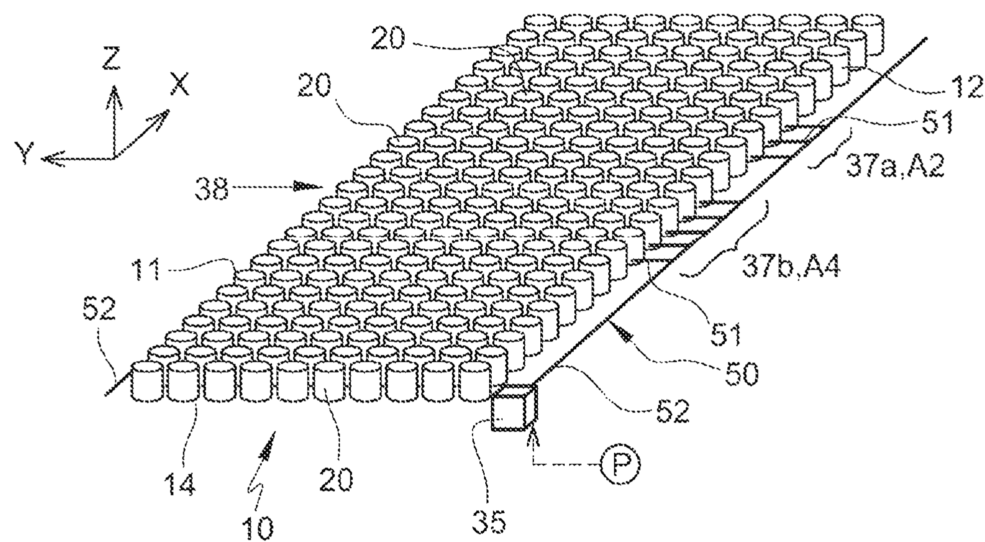
FIG. 5 is a perspective view of an embodiment of the bunk with supporting members in a first configuration.

As shown in FIG. 5, the supporting members 20 may be arranged according to an array forming rows and columns, over the whole surface of the bunk 10. The bunk 10 comprises the previously described first and second adaptable areas 37*a*, 37*b*, although other variants could be envisaged.

In each adaptable areas 37*a*, 37*b*, the bunk comprises at least one row 38 of supporting members 20 which extends transversally, preferably over the whole bunk width. For example, the first adaptable area 37*a* may comprise three rows 38 of supporting members 20, while the second adaptable area 37*b* may comprise five rows 38 of supporting members 20. Such an implementation is not limitative.

The supporting members 20 of one row 38 are movable together, as a whole, by the moving mechanism 50 along the longitudinal direction X. As schematically shown, each row 38 of supporting members 20 may comprise, at each end, a slider 51 engaged in a rail 52. The rails 52 remain in a fixed position relative to the base plate 15, while the sliders 51 can move longitudinally in the rails 52. For example, the sliders 51 may be moved by means of a cable (not shown) secured to said sliders 51 and driven by the control unit 35, depending on the current pressure data P provided by the pressure sensors 30. Some rows 38 of supporting members 20 in one adaptable area 37 may be moved as a whole. In a variant, each row 38 can be moved independently of the other rows 38, which may require one actuator (such as a cable) dedicated to the operation of one and each row 38. Similarly, the rows 38 of the first adaptable area 37*a* may be moved independently of the rows 38 of the second adaptable area 37*b*.

The supporting members 20 of one row 38 can be secured to one another; for example, two adjacent supporting members 20 may be secured through a link between their pockets 22, or the supporting members 20 can be mounted on a common transverse board which is movable by the moving mechanism 50.

The supporting members 20 outside the adaptable areas 37*a*, 37*b* are preferably motionless relative to the bunk base plate 15.

In FIGS. 5 and 6, the supporting members 20 are in a first configuration, namely arranged according to a uniform rectangular array, over the whole surface of the bunk 10. The bunk firmness is then uniform over the whole bunk surface. This may be comfortable for a user 40 lying on the back (FIG. 6). As can be seen in FIG. 6, the supporting members 20 may be dissimilarly vertically compressed, depending on the body pressure to which each supporting member is subjected and/or on the controlled action of the lifting mechanism 19.

Figure 7:
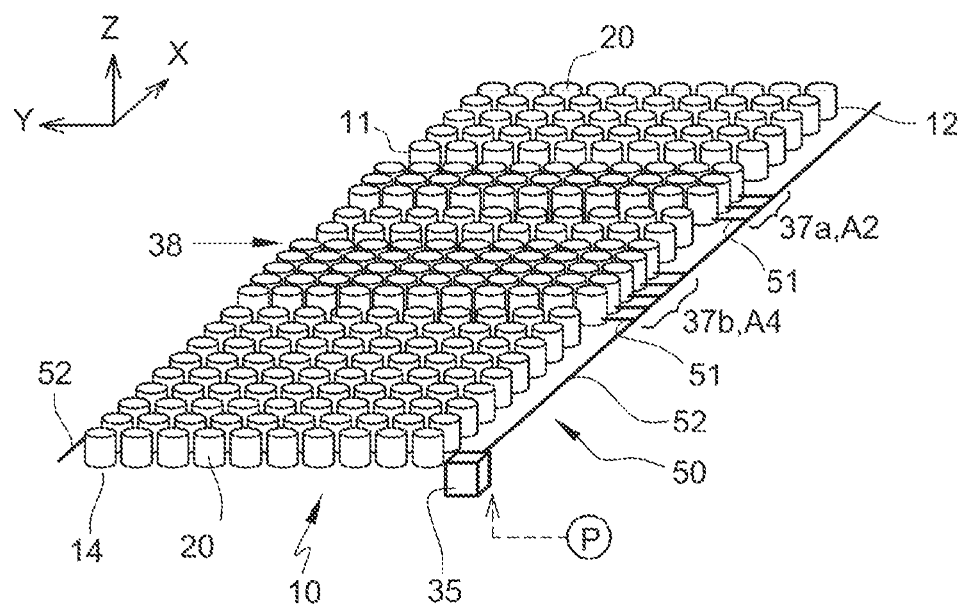
FIG. 7 is a perspective view of the bunk of FIG. 5, with the supporting members in a second configuration.

In FIGS. 7 and 8, the supporting members 20 are in a second configuration. This may result from the user 40 having changed his position to lie on his side (FIG. 8). Indeed, higher pressure is then exerted by the user's body in the shoulder and pelvis areas, i.e. in areas A2 and A4, corresponding to the first and second adaptable areas 37*a*, 37*b* of the bunk 10.

The current pressure data P corresponding to the higher pressure measured by the sensors 30 is received by the control unit 35 which controls the moving mechanism 50 in order to adapt the bunk firmness in the adaptable areas 37*a*, 37*b*. In the embodiment shown, the bunk 10 is designed so that a higher body pressure results in a local higher bunk firmness. However, an opposite solution could be envisaged.

In concrete terms, in each adaptable area 37*a*, 37*b*, the supporting members 20 have been moved closer to one another, as shown in FIG. 8, which provides a higher local firmness. In other words, in each adaptable area 37*a*, 37*b*, the supporting members 20 are spaced from one another by a distance which is smaller than the distance between adjacent supporting members 20 in other areas of the bunk 10.

It can also be seen in FIG. 8 that the supporting members 20 may further be dissimilarly vertically compressed depending on the body pressure to which each supporting member is subjected and/or on the controlled action of the lifting mechanism 19.

FIGS. 9 to 17 partially show a bunk 10 according to another embodiment of the invention. The pressure sensors 30 can be conform to the previous description with reference to either FIG. 3 or 4.

Figure 10:
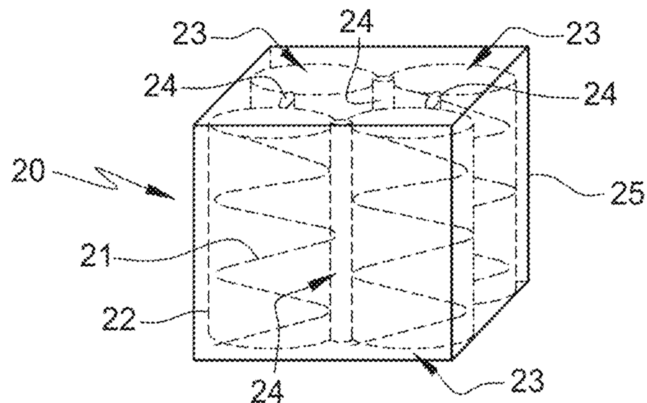
FIG. 10 is a detailed perspective view of one supporting member of the bunk of FIG. 9.
Figure 11:
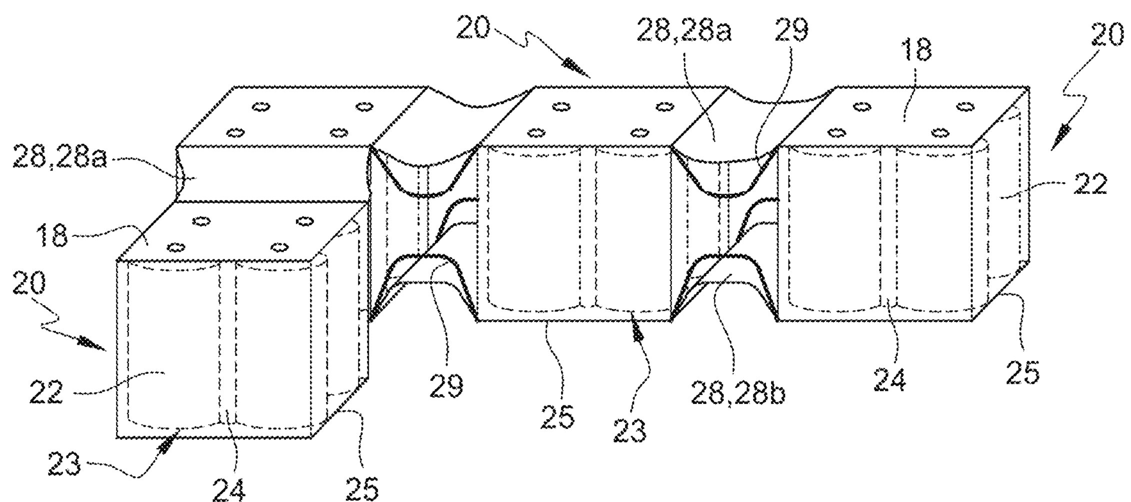
FIG. 11 shows adjacent supporting members of the bunk of FIG. 9.

At least in the adaptable area(s) 37, some or all supporting members 20 may be as shown in FIG. 10. Such a supporting member 20 comprises a plurality of supporting elements 23, here four springs 21 which are preferably individually housed in a pocket 22. The supporting elements 23 are arranged at the corners of a square or rectangle, and are rigidly connected to one another by a link 24 schematically illustrated in FIG. 10. Furthermore, the supporting elements 23 are housed in a pouch 25. As shown in FIG. 11, for example, the upper and lower faces of the pouch 25 may be provided with a sliding layer 18 to make the movement of the supporting members 20 easier.

Figure 9:
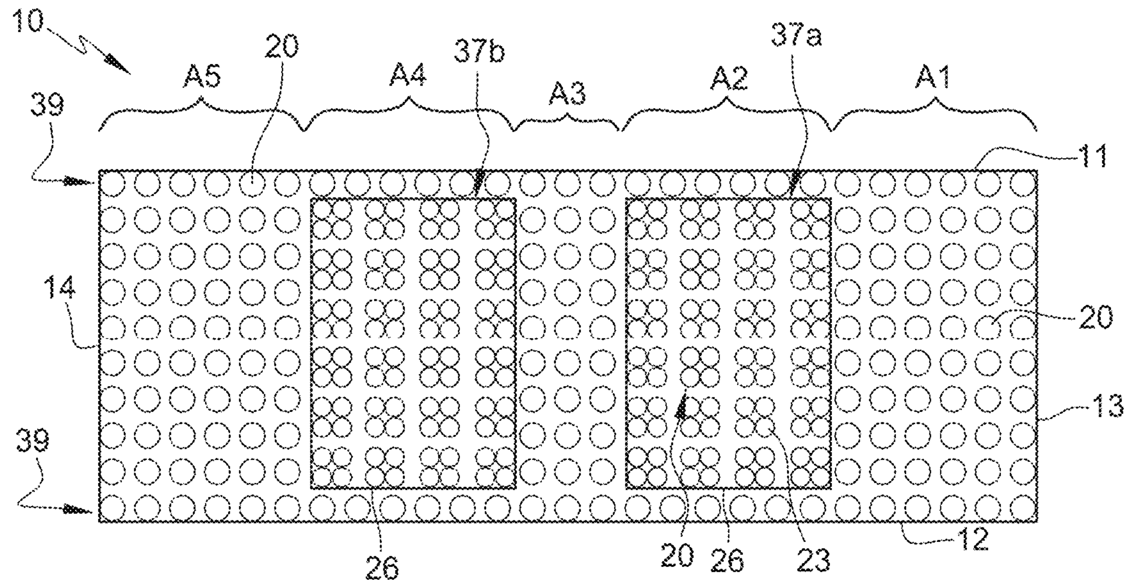
FIG. 9 is a schematic plane view of another embodiment of the bunk with supporting members in a first configuration.
Figure 12:
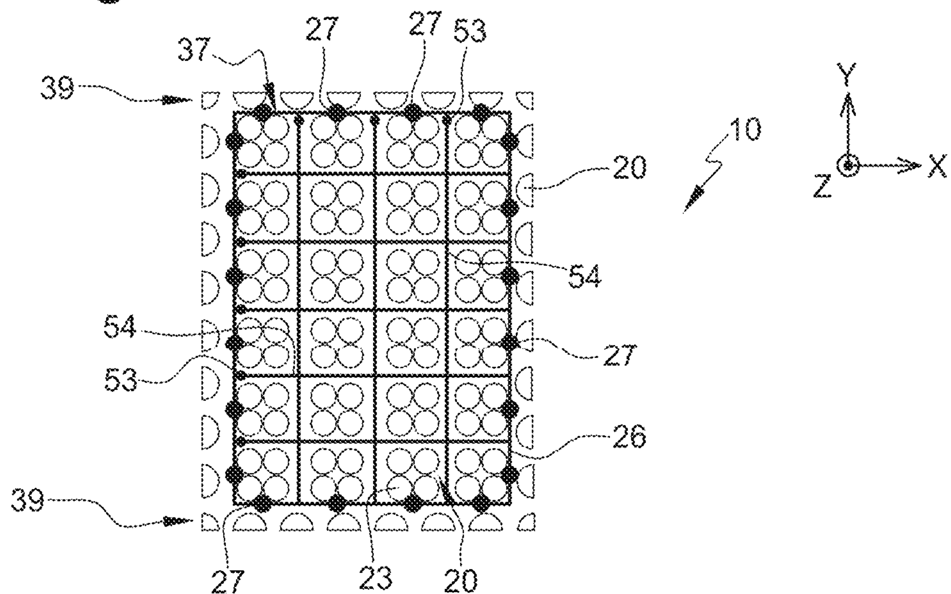
FIG. 12 is a detailed view of FIG. 9, showing the supporting members in an adaptable area of the bunk.
Figure 17:
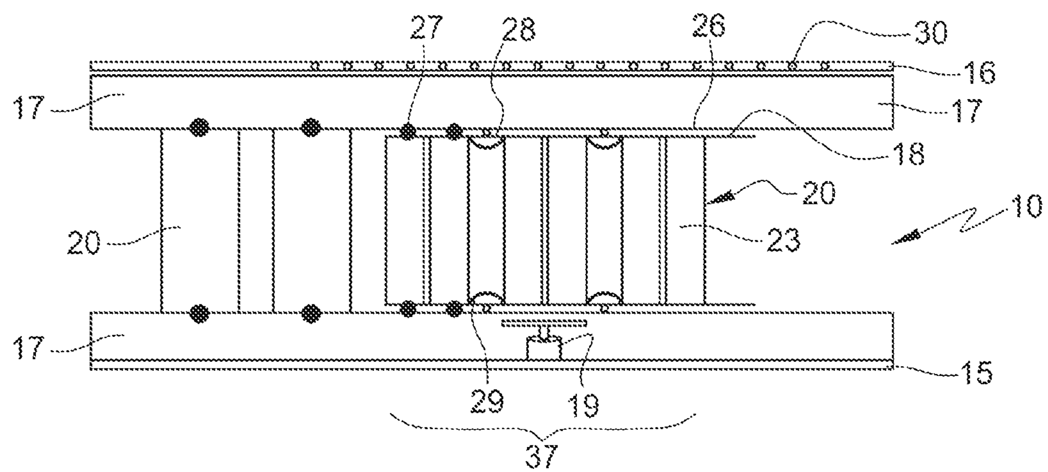
FIG. 17 is a schematic cross section view of the bunk of FIG. 9 in a vertical longitudinal plane.

In FIGS. 9, 12 and 17, the representation of supporting members 20 is partial for the sake of clarity.

In a variant, the supporting members 20 in the adaptable area(s) 37 could be as shown in FIG. 2, i.e. made of a single compressible element such as a spring.

The supporting members 20 outside the adaptable area(s) 37 are preferably as shown in FIG. 2. They may be arranged according to an array forming rows and columns, such as a uniform rectangular array. They are preferably motionless relative to the bunk base plate 15.

In the non-limiting embodiment shown in FIG. 9, the bunk 10 comprises two adaptable areas 37 which do not extend over the whole bunk width, a column 39 of stationary supporting members 20 being provided adjacent near each longitudinal edge 11, 12.

The first adaptable area 37*a* is part of the above-mentioned area A2, i.e. corresponds to a user's shoulder area; the second adaptable area 37*b* is part of the above-mentioned area A4, i.e. corresponds to a user's pelvis area. In each adaptable area 37*a*, 37*b*, the supporting members 20 are arranged according to an array forming rows and columns, such as a uniform rectangular array, and are preferably housed in an envelope 26.

In the embodiment shown in FIG. 9, one can see that there are provided more springs 21 per unit of surface in each adaptable area 37*a*, 37*b* as compared to the other areas of the bunk 10. Such an implementation allows even better adjusting to the current body pressure distribution, and ultimately greatly improves the user's comfort. For example, each adaptable area 37 may include an array of 4 rows×6 columns of supporting members 20 according to FIG. 10.

Each envelope 26 is stationary relative to the base plate 15 of the bunk. For that purpose, the walls of the envelope 26 can be secured to the surrounding supporting members 20 outside the adaptable areas 37, or to a stationary member of the bunk 10 such as the base plate 15.

Furthermore, the supporting members 20 located inside the envelope 26 and adjacent the envelope peripheral walls (i.e. the longitudinal and transverse walls of the envelope 26) are secured to the envelope 26, as schematically illustrated by dots 27 in FIG. 12.

The way adjacent supporting members 20 in the adaptable area 37 are linked to one another, preferably both in a row and in a column, are described with reference to FIG. 11.

On the one hand, two adjacent supporting members 20 in the adaptable area are linked by an elastic connection 28. The elastic connection 28 can comprise an upper sheet 28*a* extending from the pouch upper wall, and a lower sheet 28*b* extending from the pouch lower wall.

On the other hand, two adjacent supporting members 20 in the adaptable area are linked by a non-extendable connection 29. The non-extendable connection 29 may comprise at least one strand having one end secured to one supporting member 20 and an opposite end secured to an adjacent supporting member 20. There may be provided a strand on both sides of the upper sheet 28*a* and a strand on both sides of the lower sheet 28*b*.

In FIG. 11, the supporting elements 20 are shown connected to one another before they are installed into the envelope 26 in the bunk 10. The elastic connection 28 can then be loose.

Figure 13:
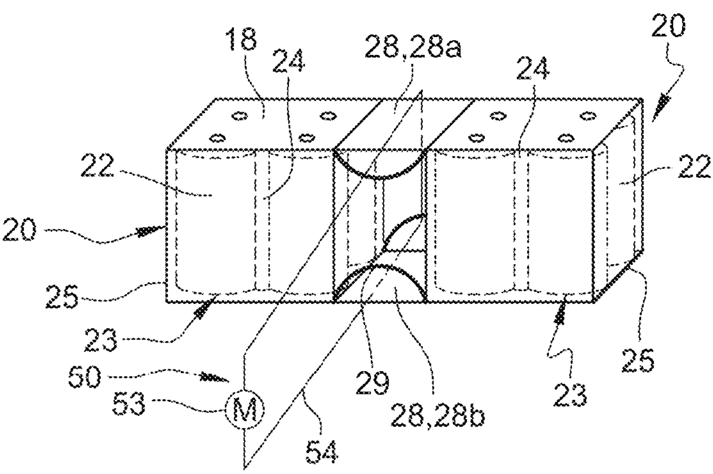
FIG. 13 shows two supporting members of the adaptable area as well as a moving mechanism.

When the supporting members 20 are mounted in the envelope 26, with the supporting members 20 inside the envelope 26 and adjacent the envelope peripheral walls being secured to the envelope 26, and when in the neutral state, i.e. when no action is applied to the supporting members 20 by the moving mechanism 50 nor by the user's body, the supporting members 20 are in the position shown in FIG. 13. The various components are dimensioned so that, in this neutral state, each elastic connection 28 is pre-tensioned and further extendable, and each non-extendable connection 29 is loose and not taut.

As shown in FIGS. 12 and 13, the moving mechanism 50 comprises several sets, each set having a motor 53 and an actuator which is operated by the motor 53 so as to be capable of moving the supporting members 20. The motor 53 can be a stepper motor. All sets are preferably housed in the envelope 26.

In the depicted embodiment, the actuator comprises a cable 54 which forms a loop. More specifically, one of such sets can be arranged in each gap between two adjacent rows of supporting members 20 as well as in each gap between two adjacent columns of supporting members 20 in the envelope 26. The corresponding cable 54 then extends substantially in a vertical transverse plane, respectively in a vertical longitudinal plane. Moreover, from the motor 53 which can be located adjacent the envelope 26, the cable 54 forms a loop passing above all successive upper sheets 28*a*, then down near the envelope wall opposite the motor 53, and under all successive lower sheets 28*b* back to the motor 53.

Owing to this moving mechanism 50, in the adaptable areas 37*a*, 37*b*, the rows of supporting members 20 can be moved together along the longitudinal direction X, and/or the columns of supporting members 20 can be moved together along the transverse direction Y, so as to locally change the bunk firmness.

From the neutral state, the supporting members 20 can be moved relative to one another as will now be described with reference to FIG. 14.

Upon determined current pressure data P measured by the sensors 30 and received by the control unit 35, the control unit 35 drives the moving mechanism 50 to appropriately move the supporting members 20. In concrete terms, the motor 53 runs (step S1 in FIG. 14) so that it can wind the cable 54 (step S2), possibly by a wind-up system not shown. As a consequence, the length of the loop formed by the cable 54 decreases, which causes the cable 54 to push on the upper sheet 28*a* and lower sheet 28*b* towards one another, along vertical direction Z. The sheets 28*a*, 28*b* are thus further extended. This continues until the cable 54 comes into contact with the non-extendable connection 29 then in a fully taut state.

The pulling action of cable 54 on the fully taut non-extendable connection 29 (step S3) causes the first and second supporting members 20*a*, 20*b* on both sides of the non-extendable connection 29 to move closer to one another (step S4). Then, the elastic connection 28 which connects one of said supporting members 20*b* to a third adjacent supporting member 20*c* is extended until the non-extendable connection 29 between said supporting members 20*b*, 20*c* is fully taut. As long as the non-extendable connection 29 is loose, the third supporting member 20*c* does not move. Then, owing to said non-extendable connection 29 in fully taut state, the motion of the second supporting member 20*b* towards the first supporting member 20*a* is transmitted to the third supporting member 20*c* (step S5). The movement can thus be transmitted from one supporting member tot the next.

Then, even if the overall density of supporting members 20 remains the same in the envelope 26, the local density of the supporting members, i.e. the number of supporting members per area unit of the base plate 15 in at least one sub-area of the envelope 26 can vary dynamically depending on the current pressure data P.

Figure 14:
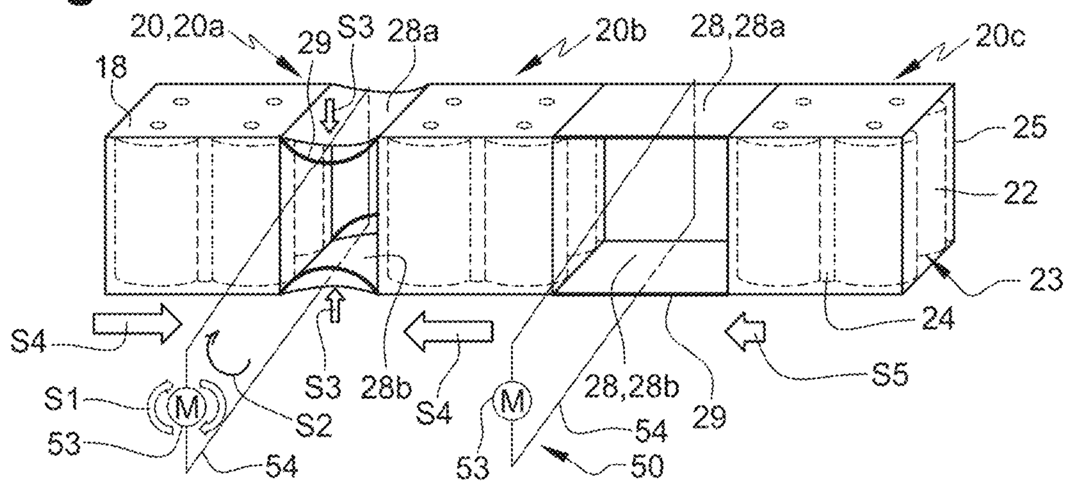
FIG. 14 shows the supporting members of the adaptable area being moved closer to one another.
Figure 15:
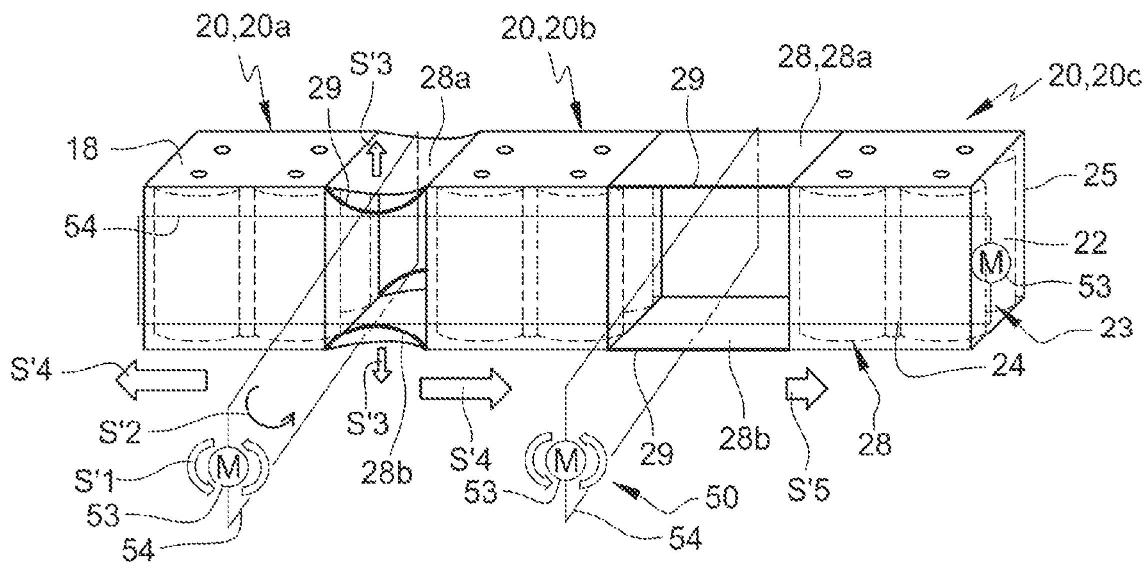
FIG. 15 shows the supporting members of the adaptable area being moved apart from one another.

From the configuration of FIG. 14, when the winding action is released, more specifically when the motor 54 turns in the opposite direction (step S'1 in FIG. 15), the length of the loop formed by the cable 53 increases (step S'2) and the non-extendable connection 29 becomes loose again (step S'3). Due to the stretched elastic connection 28, the first and second supporting members 20*a*, 20*b* elastically return towards the neutral state (step S'4). In turn, the third supporting member 20*c* is allowed to elastically move back to the neural position (step S'5).

Figure 16:
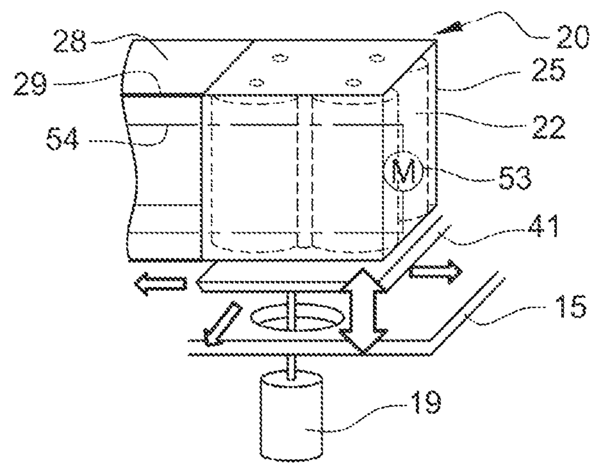
FIG. 16 is a detailed view of an embodiment of a bunk according to the invention, comprising a lifting mechanism under a supporting member.

FIG. 16 shows an optional feature allowing to further adapt the bunk firmness. For that purpose, the bunk 10 may further comprise at least one lifting mechanism 19 such as a cylinder, arranged under one or several supporting members 20, to vertically compress it/them by means of a pressure board 41.

According to a variant of the previously described embodiments, each supporting member 20 of one adaptable area 37 is movable independently of other supporting members 20. For that purpose, each supporting member 20 has to be operated by its own moving mechanism 35, which must be independently controlled. Such an implementation allows further improving comfort for the user 40.

The invention provides a bunk having automatically adaptive local firmness for all users, whatever their morphology (stature, weight, etc.), whatever the pressure distribution (typically whether the user lies on his back or on his side), without any specific action from the user. This ensures comfort all over the night, therefore good and efficient sleeping, and ultimately increased safety.

It is to be understood that the present invention is not limited to the embodiments described above and illustrated in the drawings; rather, the skilled person will recognize that many changes and modifications may be made within the scope of the appended claims.

The invention claimed is:

1. A bunk, in particular for a vehicle cabin, comprising:
- a base plate;
- an upper layer;
- a plurality of supporting members which are vertically compressible, such as springs, the supporting members being arranged spaced apart from one another, according to an array, substantially over a whole surface of the bunk;
- a plurality of pressure sensors which are part of the upper layer and arranged in an adaptable area comprising at least one area of the bunk;
- a moving mechanism connected to at least some of the supporting members located in the adaptable area, configured to move the supporting members with respect to and parallel to the base plate; and
- a control unit connected to the pressure sensors and to the moving mechanism, the control unit being configured to cause the moving mechanism to automatically and dynamically move the supporting members in the adaptable area, as a function of current pressure data provided by the pressure sensors, so as to locally change the density of the supporting members in order to provide a locally variable bunk firmness;
- wherein two adjacent supporting members in the adaptable area are linked by both an elastic connection and a non-extendable connection;
- wherein in a neutral state, the elastic connection is pretensioned and further extendable, and the non-extendable connection is loose and thus inactive for motion transmission;
- wherein from the neutral state, the two adjacent supporting members can be moved relative to one another when an appropriate action is applied by the moving mechanism on the supporting members, the elastic connection then being further extended and the non-extendable connection then being fully taut and thus able to transmit motion of one of the two adjacent supporting members, caused by the moving mechanism, to the other one of the two adjacent supporting members; and
- wherein the elastic connection is configured to cause the two adjacent supporting members to elastically return to the neutral state upon release of the appropriate action applied by the moving mechanism.

2. The bunk of claim 1, wherein the pressure sensors comprise a pressure-sensitive wire which is preferably assembled with yarns to form at least part of the upper layer.

3. The bunk of claim 1, wherein the plurality of pressure sensors comprise distinct sensors.

4. The bunk of claim 1, comprising a sliding layer arranged between the supporting members and the upper layer, at least in the adaptable area.

5. The bunk of claim 1, comprising at least two adaptable areas, wherein, preferably:
- a first adaptable area corresponds to a user's shoulder area; and a second adaptable area corresponds to a user's pelvis area.

6. The bunk of claim 1, wherein the bunk has a substantially rectangular shape defining a longitudinal direction and a transverse direction, wherein, in the adaptable area, the bunk comprises at least one row of supporting members which extends transversely, the supporting members of the row being movable together by the moving mechanism along the longitudinal direction.

7. The bunk of claim 1, wherein the bunk has a substantially rectangular shape defining a longitudinal direction and a transverse direction, wherein, in the adaptable area, the bunk comprises at least one column of supporting members which extends longitudinally, the supporting members of the column being movable together by the moving mechanism along the transverse direction.

8. The bunk of claim 1, wherein the moving mechanism comprises a motor and an actuator operated by the motor and capable of moving the supporting members.

9. The bunk of claim 1, wherein at least one supporting member comprises a plurality of supporting elements which are rigidly connected to one another and housed in a pouch.

10. The bunk of claim 1, further comprising at least one lifting mechanism, which is arranged under at least one supporting member of the plurality of supporting members to vertically compress the at least one supporting member, so as to further allow locally changing bunk firmness.

11. A vehicle, comprising the bunk of claim 1.

12. A method for dynamically changing firmness of a bunk according to claim 1 in at least one adaptable area of the bunk, the method comprising:

receiving current pressure data measured by the plurality of pressure sensors; and as a function of current pressure data, automatically and dynamically moving the two adjacent supporting members, so as to locally change the density of the supporting members.

* * * * *